United States Patent [19]

De Boel et al.

[11] 4,175,162
[45] Nov. 20, 1979

[54] METHOD OF MANUFACTURING A LAMINATED, LIGHT TRANSMITTING, FIRE SCREENING PANEL

[75] Inventors: Marcel De Boel, Chatelineau; Pol Baudin, Fontaine l'Eveque; Michel Wasterlain, Trazegnies; Pierre Collignon, Marcinelle, all of Belgium

[73] Assignee: BFG Glassgroup, Paris, France

[21] Appl. No.: 855,453

[22] Filed: Nov. 28, 1977

[30] Foreign Application Priority Data

Nov. 30, 1976 [GB] United Kingdom ............... 49850/76

[51] Int. Cl.² .......................................... B32B 17/06
[52] U.S. Cl. .................................. 428/428; 156/103; 156/104; 156/105; 156/106; 156/246; 156/286; 156/309; 156/312; 156/325; 428/448; 428/920
[58] Field of Search ................... 156/87, 89, 103, 104, 156/105, 106, 107, 246, 286, 309, 312, 319, 325; 428/428, 332, 448, 920, 921

[56] References Cited

U.S. PATENT DOCUMENTS

| | | | |
|---|---|---|---|
| 1,909,444 | 5/1933 | Worrell | 156/104 |
| 3,405,019 | 10/1968 | Seil et al. | 156/286 |
| 3,582,455 | 6/1971 | De Lap et al. | 428/428 |
| 3,681,171 | 8/1972 | Hojo et al. | 156/286 |
| 3,703,422 | 11/1972 | Yoshino | 156/286 |
| 3,738,890 | 6/1973 | Johnson et al. | 156/286 |
| 3,769,133 | 10/1973 | Halberschmidt et al. | 156/286 |
| 3,793,105 | 2/1974 | Birchell et al. | 156/106 |
| 3,852,136 | 12/1974 | Plumat et al. | 156/103 |
| 3,912,542 | 10/1975 | Hirano et al. | 156/286 |
| 3,997,700 | 12/1976 | Jacquemin et al. | 428/332 |
| 4,048,005 | 9/1977 | Nakagome et al. | 156/246 |

FOREIGN PATENT DOCUMENTS

7002210 8/1970 Netherlands ............................ 156/103

*Primary Examiner*—Jerome W. Massie
*Attorney, Agent, or Firm*—Cushman, Darby & Cushman

[57] ABSTRACT

A method of manufacturing a laminated, light-transmitting fire-screening panel comprising at least one solid layer of intumescent material sandwiched between two structural plies without the use of a sheet of plastic material to effect the bonding, comprising the steps of forming a stratum from an intumescent material assembling the stratum and a first structural ply to an inorganic face of a pane comprising a second structural ply so that the stratum is in contact with the inorganic face and sandwiched between the structural plies, enveloping at least the edges of the sandwich assembly in such manner as to define a space around the edges in which sub-atmospheric pressure can be created for subjecting the inter-ply space to suction at the edges, and subjecting the sandwich assembly to a treatment in which at least one of the main external faces of the sandwich assembly is exposed to sub-atmospheric environmental pressure while the sandwich assembly is exposed to heat in a treatment chamber and the inter-ply space is subjected to the aforesaid suction to effect bonding of the various plies without causing the intumescent material to become tumid.

19 Claims, 6 Drawing Figures

METHOD OF MANUFACTURING A LAMINATED, LIGHT TRANSMITTING, FIRE SCREENING PANEL

This invention relates to a method of manufacturing a laminated, light-transmitting, fire-screening panel comprising at least one solid layer of intumescent material sandwiched between two structural plies. The invention also provides a panel manufactured by such a method.

In the construction of buildings, light-transmitting panels have sometimes to be used in, for example, interior walls to form partitions, and such partitions have occasionally to satisfy certain standards of fire resistance. For example, when a panel is exposed to a particular temperature cycle for a specified time, such a standard may require that the panel should retain its strength, unbroken, so as to remain as a fumeproof barrier, that it should be completely flameproof, that it should act as an infra-red radiation screening barrier and that the side thereof further from the source of heat should not become so hot as to involve serious risk of burning a person who touches it.

Clearly an ordinary glass sheet will not satisfy these requirements for any significant time, and it has accordingly been proposed to use laminated panels in which a layer of intumescent material is sandwiched between two sheets of glass. Such panels have been made by depositing a layer of intumescent material onto a first glass sheet and drying the layer so that it is bonded to the sheet, and then bonding the layer to a second glass sheet by means of an intervening layer of plastics material such as polyvinyl butyral. Although this has gone a long way toward meeting the fire resistance standards referred to above for sufficiently long periods of exposure to fire, this panel manufacturing method does suffer from certain disadvantages, in particular as regards the cost and inconvenience of having to use a sheet of plastics material.

It is an object of the present invention to provide a new method of manufacturing a laminated, light-transmitting, fire-screening panel which on exposure to fire can have satisfactory fire-screening properties, and which does not require the presence of a sheet of plastics material such as polyvinyl butyral to insure bonding of its various plies.

According to the present invention as broadly defined, there is provided a method of manufacturing a laminated, light-transmitting, fire-screening panel comprising at least one solid layer of intumescent material sandwiched between two structural plies, which comprises the steps of forming a stratum from an intumescent material, assembling the stratum and a first structural ply to an inorganic face of a pane comprising a second structural ply so that the stratum is in contact with the inorganic face and sandwiched between the structural plies, enveloping at least the edges of the assembled sandwich in such manner as to define a space around the edges in which sub-atmospheric pressure can be created for subjecting the inter-ply spaces to suction at the edges, exposing the assembly to sub-atmospheric environmental pressure acting upon at least one of the main external faces of the sandwich while the sandwich is exposed to heat in a treatment chamber and the inter-ply space is subjected to the aforesaid suction, to effect bonding of the various plies without causing the intumescent material to become tumid.

The expression 'structural ply' is used herein to denote a ply which substantially contributes to the strength and/or rigidity of the finished panel.

The invention thus provides a new method of manufacturing a laminated, light-transmitting, fire-screening panel incorporating a layer of material which, on exposure to fire, can form an effective fire-screening barrier, and which does not require the presence of a sheet of plastics material in order to insure bonding of the various plies. It is a further advantage of the invention that it can be performed using known apparatus, as for example, apparatus such as disclosed in commonly assigned U.S. Pat. No. 3,852,136.

The performance of the treatment procedure in which the inter-ply space is subjected to suction while being heated in a work space at sub-atmospheric pressure affords the advantage that bonding of the various plies is obtained easily. This appears to be due at least in part to removal of at least some air and any eventual excess of water or other solvent (present in the intumescent material) from between the plies before they become bonded together. In fact the air which is sucked off will necessarily carry with it some solvent vapor.

In some cases, depending on the temperature in the treatment zone and the duration of such treatment, quantities of gas occluded in the intumescent material are removed, and this further contributes to the good results. The sucking off of gas from between the plies at the edges of the sandwich is facilitated by the fact that the whole assembly is exposed to sub-atmospheric environmental pressure. It was found that if the assembly as a whole is not exposed to sub-atmospheric environmental pressure, the subjection of the inter-ply space to suction by creating an external sub-atmospheric pressure around the edges of the sandwich does not have so advantageous an effect, due presumably to trapping of gas bubbles between the sheets in the central part of the sandwich.

Preferably in the treatment procedure, the subjection of the sandwich to sub-atmospheric environmental pressure and to heating, and the subjection of the intersheet space to suction commence simultaneously. This has been found to be a matter of practical convenience.

Advantageously, the external sub-atmospheric pressure in the space around the edges of the sandwich is different from the sub-atmospheric environmental pressure acting upon at least one of the main external faces of the sandwich for at least a portion of the treatment period. In this way, the suction of gases from the intersheet space can be caused to proceed in a controlled manner.

Preferably the sub-atmospheric pressure in the space around the edges is reduced during the treatment procedure, such sub-atmospheric pressure being initially higher but becoming lower than the sub-atmospheric pressure acting on at least one of the main external faces. This feature helps to avoid premature bonding of the sheets or at least to avoid bonding to such an extent as substantially to hinder extraction of air and any vapor which it carries from between the sheets.

In order to promote rapid degasification, the external sub-atmospheric pressure in the space around the edges is preferably reduced from atmospheric pressure to 20 mm of mercury or less, more preferably 10 mm of mercury or less.

The environmental pressure acting upon at least one of the main external faces during the treatment procedure is preferably reduced from atmospheric pressure to 500 mm of mercury or less, and more preferably 200 mm of mercury or less.

Such pressures are sufficiently below atmospheric to permit substantial extraction of air from between the sheets without eliminating water from the intumescent material in a quantity which is deleterious for its intumescent properties and optical properties. Such pressures are also convenient for bonding in a short period of time in the case of assemblies incorporating sheets of a size and weight within the ranges ordinarily encountered in the manufacture of glazing panels. Moreover, if the environmental pressure acting upon at least one of the main external faces becomes as low as 200 mm of mercury or less, the effect of exposing the sandwich to atmospheric or higher environmental pressure at the end of the treatment procedure, in forcing the sheets together, can be appreciable.

The environmental temperature during the treatment according to the invention is preferably at least 50° C., for example, it may be 60° C. or above. At that temperature the extraction of air from between the sheets can proceed reasonably quickly. It is preferred for the environmental temperature to be not higher than 120° C. If the temperature is maintained at or below that level there is little risk of air extraction from between the sheets being hindered by premature bonding of the sheets or of the intumescent material becoming tumid. In other words, the environmental temperature is chosen so that the temperature of the intumescent layer is maintained below the level at which the material of which it is composed will intumesce. Preferably, having regard to the pressure conditions, this temperature will not be more than 95° C., for example, it may be 70° C. or below.

During the treatment, the temperature of the sandwich may be maintained constant, that is, the sandwich may be preheated to the environmental temperature subsisting in the treatment chamber. However, the temperature of the sandwich is preferably progressively increased during the treatment. Such increase in temperature moreover promotes uniform degasification over the whole area of the sandwich without interruption of such degasification as a result of premature effective bonding of the sheets. The treatment may, for example, take place in a zone into which the sandwich is introduced without being pre-heated so that it heats up in the enclosure as the treatment proceeds. For reasons of economy it is preferable to maintain the enclosure at a substantially constant temperature during series production of laminates rather than to allow it to cool and reheat it each time a sandwich or batch of sandwiches is introduced.

According to another preferred embodiment of the invention, during the treatment the sub-atmospheric pressure acting upon at least one of the main external faces is reduced to a value of 200 mm of mercury or less before increased to a value above 400 mm of mercury while the assembly is progressively heated and while sub-atmospheric pressure is maintained in the space around the edges.

Preferably, sub-atmospheric pressure around the edges of the sandwich is maintained after the environmental pressure on the main external face or faces of the sandwich has been increased to atmospheric pressure or higher. This treatment program can be achieved by establishing the sub-atmospheric pressure around the edges while the sandwich is in an enclosure in which the environmental pressure is sub-atmospheric and then, after a suitable interval of time, connecting the interior of the enclosure to atmosphere while keeping the edges of the sandwich in communication with a zone in which the pressure is kept below atmospheric pressure. In the most preferred embodiments of the invention, the pressure around the edges of the sandwich is increased to atmospheric when the desired temperature for the sandwich has been reached and after the environmental pressure acting on the main external face or faces of the assembly has been increased to atmospheric pressure or higher. This is found to promote bonding.

In certain particularly advantageous embodiments of the invention, after the sub-atmospheric environmental pressure acting upon at least one of the main external faces is increased, preferably to atmospheric pressure, the sandwich is then subjected to a following bonding stage. Advantageously, in such a following stage, the sandwich is subjected to heat and pressure enabling a better bonding of its various plies to occur. In such bonding stage the sandwich can, if desired, remain in the enclosure used for the preliminary treatment or it can be removed from that enclosure to give way to a following sandwich to be treated. Preferably, the sandwich is heated under pressure in an autoclave in a final stage to remove any possible residual bubbles from its edges.

During the bonding stage following the preliminary treatment, the temperature of the sandwich is preferably progressively further increased. By way of example, after the preliminary treatment at sub-atmospheric pressure the sandwich can be introduced into a zone where the temperature is above 100° C. The thermal action thus achieved has multiple beneficial effects on the degasification, and the speed of the operations, and promotes the effective bonding of the sheets. Such temperature must be at a level such as to avoid intumescence of the sandwiched layer, so that if the temperature of the sandwich is increased to above 100° C., the sandwich must be in an enclosure in which super atmospheric pressure subsists. An increase in temperature during the bonding stage can take place before and/or after the suction created by the sub-atmospheric pressure in the space around the edges has been terminated, assuming that that termination takes place in course of the bonding stage.

The final bonding following the preliminary treatment advantageously takes place at above atmospheric pressure. In order to achieve the best results it is presently believed that such bonding should take place at pressures in excess of 10 kg/cm$^2$, for example, at 13 kg/cm$^2$.

The sub-atmospheric pressure in the space around the edges which aspirates a gaseous substance from the inter-sheet space can be created in a sealing device in the form of an endless tube which is open at its inner periphery to form endless opposed lips which seal against the main faces of the sandwich at its margin. In that case, whatever the material from which the sealing device is made, thermal insulation of the faces of the sandwich from the environmental heat is reduced to a minimum.

According to preferred embodiments, the aspiration of a gaseous substance from the inter-sheet space is achieved by maintaining sub-atmospheric pressure conditions in an envelope which encloses the sandwich while preserving a space between the inner surface of the envelope and the sandwich edges. In that case it is easy to keep an even heat distribution over the whole sandwich if this is desired. Operating in this way also enables a uniform pressure to be applied across the major faces of the sandwich assembly. This can be important. Under some circumstances when using a slit sealing tube whose slit edges seal against margins of the main faces of the sandwich to define the space around the edges and when the pressure in such edge space is lower than the environmental pressure in a treatment chamber, reaction forces exerted by the slit edges of the tube can cause the outer sheets of the assembly to go convex. If the pressure in such edge space is then increased to equal the environmental pressure in the chamber, for example at atmospheric pressure, then this convexity will relax and it may be the case that air bubbles will be sucked in to the edges of a sandwiched layer of intumescent material. Even though this does not always happen, and despite the fact that any such bubbles will generally be masked by a frame in which the completed panel is set, this is clearly undesirable. Furthermore, if the environmental pressure in a treatment chamber is increased to a superatmospheric pressure in a subsequent bonding stage, it may be that the sheets forming the external faces of the sandwich will go concave, thus resulting in a non-flat product. The use of an envelope avoids these difficulties since a more even pressure distribution can be achieved. For the best results, pressure reaction forces which would otherwise be applied to the margins of the sandwich are supported by one or more bracing members located within the space around the edges of the sandwich.

In cases where there is only a slight risk of fire breaking out on one side of a panel made in accordance with the invention, then the structural ply to be located on that side may, for example, be made of a plastics material. Preferably, however, each structural ply is a vitreous sheet. The word 'vitreous' as used herein is intended to comprehend glass and vitro-crystalline material which is a material which can be made by subjecting a glass to a treatment such as to induce the formation of one or more crystalline phases therein.

In certain embodiments of the invention, an intumescent stratum is formed on the first structural ply and is bonded directly to the second structural ply to form the panel. Preferably, however, the intumescent layer is built up from a plurality of strata. Increasing the thickness of the intumescent layer will, of course, increase its effectiveness as a fire-screening barrier, and the present invention provides a method which is particularly convenient for forming thick, high-quality layers. It is very difficult to form in one step a thick layer of intumescent material which has satisfactory optical properties. Thus, for example, the inorganic face of the pane comprising the second structural ply to which an intumescent stratum formed on the first structural ply may be applied may be constituted by a face of a second layer of intumescent material which is applied and bonded to the second structural ply prior to assembly to the sandwich.

In certain embodiments of the invention, each stratum of intumescent material is preformed on a temporary support which is removed from the stratum during assembly of the sandwich. Such a support is preferably of a flexible material, for example, polyethylene, polyvinyl chloride or a silicone, so that it can readily be peeled away from the stratum after adhesion transfer of the latter to a structural ply or a previously transferred layer. Advantageously each stratum of intumescent material can be preformed on a temporary support by applying that material in fluid state to a vapor permeable mold and then causing or allowing it to set to form the stratum. In this way it is easily possible to avoid the difficulties which arise in trying to form a uniform layer of good quality which totally covers a structural ply. Also, this procedure is found more convenient for building up thick layers of intumescent material. It will, of course, be appreciated that it is within the scope of the invention to form a panel whose sandwich layer contains, for example, three strata, by forming one such strata on each structural ply and a third stratum on a temporary support, but for the sake of uniformity in the industrial process it is possible to form each such stratum in exactly the same way on a temporary support, and then transfer them one by one to a structural ply.

Preferably, the intumescent material is a hydrated metal salt. Examples of metal salts which can be used in hydrated form are as follows:
 Aluminates, e.g. sodium or potassium aluminate
 Plumbates, e.g. sodium or potassium plumbate
 Stannates, e.g. sodium or potassium stannate
 Alums, e.g. sodium aluminum sulphate or potassium aluminum sulphate
 Borates, e.g. sodium borate
 Phosphates, e.g. sodium orthophosphates, potassium orthophosphates and aluminum phosphate Hydrated alkali metal silicates, e.g. sodium silicate, are especially suitable for use in a layer of intumescent material. Such substances have very good properties for the purpose in view. They are in many cases capable of forming transparent layers which adhere well to glass or vitro-crystalline material. On being sufficiently heated, the combined water boils and the layers foam, so that the hydrated metal salt is converted into an opaque, solid, porous mass of cellular form in which it is highly thermally insulating and remains adherent to the glass or vitro-crystalline material. This feature is particularly important, because even if all the structural plies of the panel are cracked or broken by thermal shock, the panel may retain its effectiveness as a barrier against heat and fumes since the fragments of the plies may remain in position bonded together by the converted metal salt.

Advantageously, the intumescent material is formed into a layer by drying an aqueous solution. When using sodium silicate it is preferred to use a solution in which the weight ratio of $SiO_2$ to $Na_2O$ is from 3.3 to 3.4 and whose density is from 37° to 40° Baumé.

The intumescent material may be applied in wet state to form a stratum on a support (whether temporary or permanent) by pouring, dipping or spraying. A stratum of intumescent material is suitably dried by placing it in a current of warm air of controlled temperature and humidity, e.g. air at 35° C. and 50% relative humidity. Such warm air current may e.g. be directed by a fan.

When using sodium silicate as the intumescent material, it is preferred to dry the layer until it contains between 30% and 40% by weight of water. It should be borne in mind that the cohesiveness of the layer will be greater with reduced amounts of water, but that the more water is present, the more effective will the layer be as an intumescent fire-screening barrier.

In some embodiments, a layer of hydrated metal salt is used which is merely translucent, but preferably the hydrated metal salt forms a transparent solid layer at ambient temperature. Sodium silicate, sodium aluminum sulphate and aluminum phosphate can form transparent layers. Preferably, the amount of intumescent material is such as to form at least one layer of up to 8 mm thick. Such a layer may be built up from strata between 0.1 mm and 3 mm thick, for example between 0.8 mm and 1.5 mm thick. Such layer and stratum thicknesses are found to give a good compromise between cost, light transmission before exposure to fire, and fire resistance.

Each vitreous ply for assembly into the panel may be tempered, e.g. chemically tempered.

It has been found that vitreous sheets may suffer deterioration to varying degree by prolonged contact with various intumescent materials, e.g. hydrated metal salts. This is particularly important in the case of transparent or colored sheets, since they may suffer a loss of transparency or undergo a change in color.

Advantageously, therefore, a protective coating is formed on at least one and preferably each vitreous ply face before the intumescent material is applied to such face, and the protective coating is composed of a substance selected so as to inhibit interaction between the intumescent material and such ply face.

Such a protective coating preferably comprises an anhydrous metal compound deposited onto one or more ply faces, since such coatings can form very effective protective strata. Preferably, the anhydrous metal compound is deposited by hydrolysis, since this is convenient in practice. Another very convenient way of depositing the anhydrous metal compound is by pyrolysis. Preferably the protective coating is between 100 and 1,000 Angstrom units thick, so as to provide a non-porous coating without giving rise to unsightly interference effects.

Clearly, one criterion affecting choice of a suitable coating material will be the composition of the intumescent material. By way of example, when the intumescent material comprises a hydrated metal salt selected from sodium aluminum sulphate, aluminum phosphate and alkali metal silicates, the anhydrous metal compound is preferably selected from zirconium oxide and anhydrous aluminum phosphate. It is perhaps surprising to note that a protective coating of anhydrous aluminum phosphate when deposited onto a vitreous sheet will serve substantially to prevent interaction between that vitreous sheet and an adjacent layer of hydrated aluminum phosphate.

This invention does not exclude the use of other materials. For example, when the intumescent material comprises hydrated aluminum phosphate, titanium oxide and tin oxide are also eminently suitable coating materials. Alternatively, or in addition, a coating having other properties may be applied to a vitreous sheet of the panel. For example, an infra-red reflecting coating of a noble metal, copper, aluminum or an oxide may be applied and this will have the advantage of affording some protection for the intumescent material against the absorption of infra-red radiation which could cause the intumescent material to become opaque and blister even before the advent of fire. Furthermore, the use of such an infra-red reflecting coating can increase the time taken for the layer to intumesce on the outbreak of fire, and this will in turn increase the time for which protection is given.

An embodiment of the invention selected by way of example, will now be described with reference to the accompanying diagrammatic drawings in which.

Figure 1:
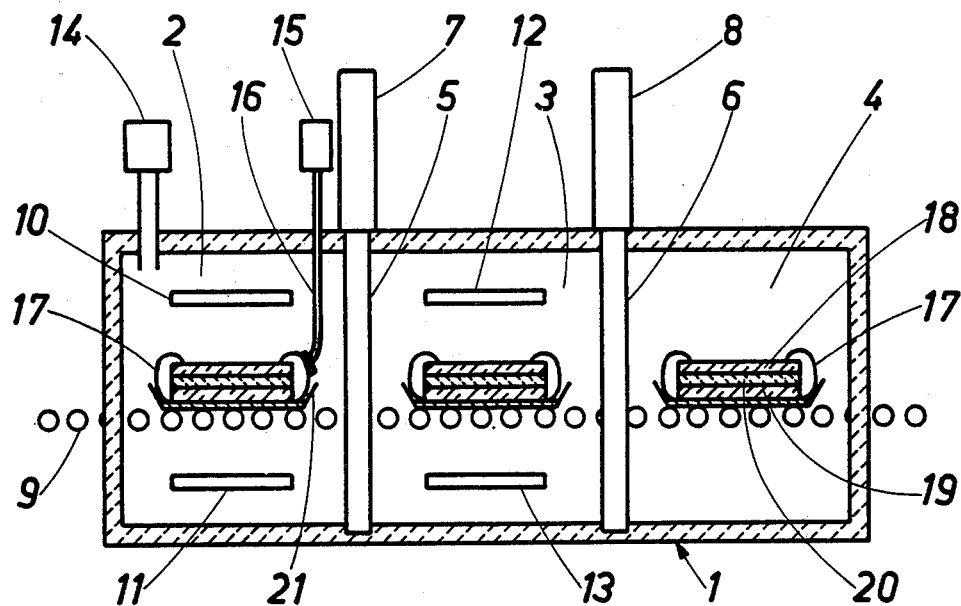
FIG. 1 is a vertical longitudinal cross-section of an apparatus for performing a treatment in accordance with the invention.

The apparatus illustrated in FIG. 1 comprises an enclosure 1, divided into three chambers, 2, 3 and 4 by partitions 5 and 6 which are respectively controlled by automatic mechanisms 7 and 8. A roller conveyor 9 is arranged with an upper conveying reach following a course through the chambers 2, 3 and 4 up to a discharge station (not shown), and with its return reach (not shown) running beneath the enclosure 1, back to a loading station (not shown).

The compartment 2 is provided with heating elements 10 and 11 and compartment 3 is provided with heating elements 12 and 13. Two vacuum pumps 14 and 15 are associated with the compartment 2. Pump 14 is connected to the environmental atmosphere within the compartment 2 and the pump 15 is connected via a conduit 16 to a sealing tube 17 which is made of flexible material.

The flexible sealing tube 17 is an endless or circular tube which is open at its inner periphery and is fitted to the margin of the sandwich which is to form the laminate. The sandwich shown comprises two glass sheets 18 and 19 and an intervening intumescent layer 20. This sandwich is placed on a support or carriage 21 which is conveyed into compartment 2 by the roller conveyor 9, the entrance to the compartment then being closed. The heating elements 10 and 11 maintain the temperature in this compartment at about 120° C.

On being introduced into the compartment 2, the sandwich is immediately heated. At the same time, the vacuum pump 14 creates in the compartment 2 a pressure which is below atmospheric and not more than 500 mm of mercury and preferably not more than 200 mm of mercury. In one particular case which is especially convenient for bonding sandwiches containing silicate layers, for example, sandwiches such as will be described in Examples 1 to 5 of this specification, the environmental pressure in compartment 2 is maintained at about 70 mm of mercury, while the pump 15 reduces the pressure within the marginal sealing tube 17 to a few mm of mercury.

The sandwich is progressively heated in the compartment 2, in order to facilitate degasification. In one particular embodiment, especially convenient for silicate layers, the temperature of the sandwich increases about 3° C. per minute. Before the temperature of the sandwich reaches 70° C., e.g. when the temperature is between 30° and 40° C., the environmental pressure in compartment 2 is increased to atmospheric pressure. This pressure acts on the upper main external face of the sandwich. The pump 15 is stopped while conduit 16 is closed so that sub-atmospheric pressure within the tube 17 is meanwhile maintained, while the sandwich continues to be heated in compartment 2, until the sandwich reaches a temperature near 70° C.

Figure 2:
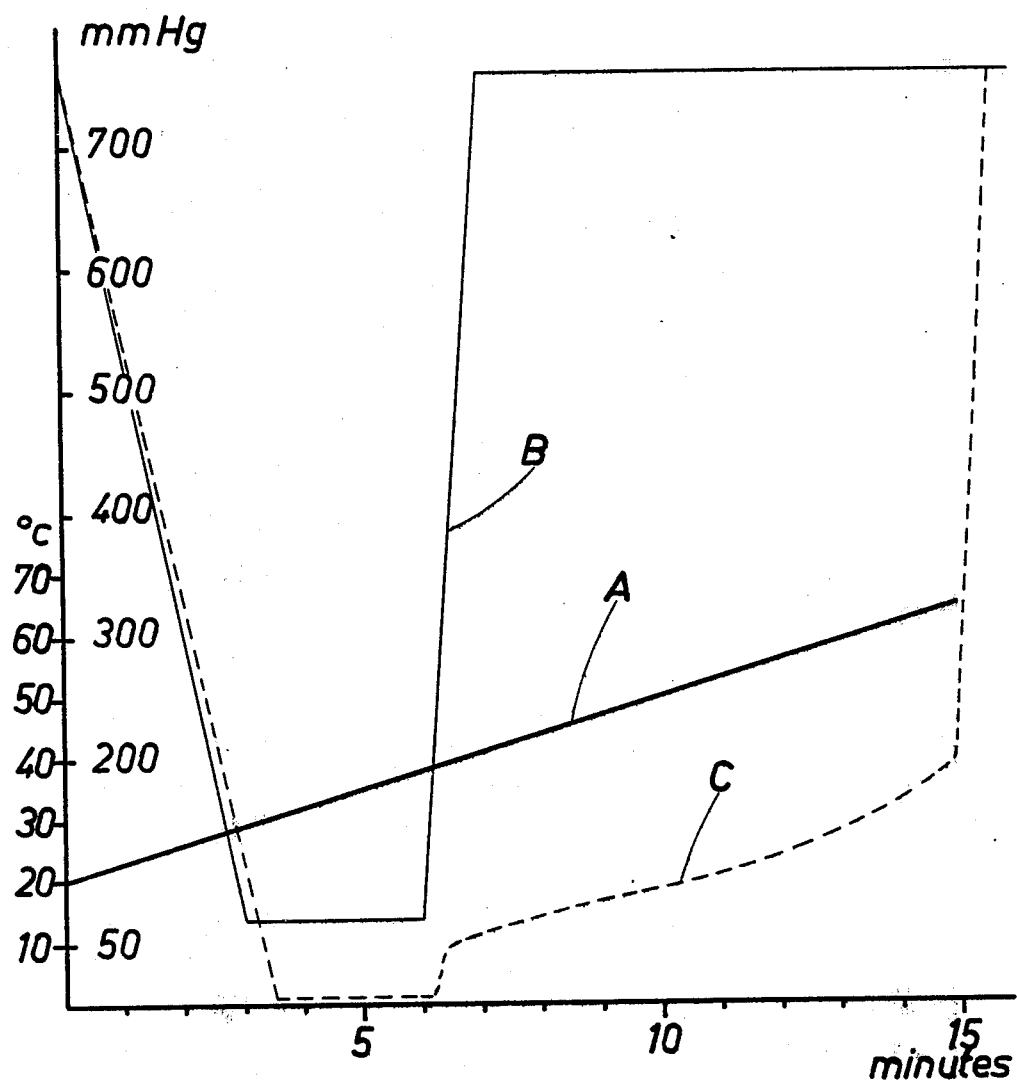
FIG. 2 is a graph showing how temperature and pressures are varied during the course of treatment.

One specific temperature and pressure schedule treatment of a sandwich in the compartment 2 is shown in FIG. 2. In FIG. 2, the ordinate is marked for pressure in mm Hg and for temperature in °C. while the abscissa is marked in minutes. The heavy continuous line indicated at A shows how the temperature of a sandwich introduced into the compartment 2 rises from an initial value of 20° C. to a value of approximately 70° C. after 15 minutes. The light continuous line indicated at B shows variations in the environmental pressure in the compartment 2, that is, the pressure which acts on the upper main face of the sandwich, while the dotted line C indicates variations in the pressure within the marginal sealing tube, that is, the pressure acting on the edges of the sandwich.

It will be noted that according to the illustrated schedule pressures acting on the sandwich are reduced as soon as the sandwich enters the compartment 2, so that at the end of 3 minutes, the pressure acting on the main face of the sandwich is reduced to 70 mm Hg while the pressure acting on the edges of the assembly is reduced to a few mm Hg by the time $3\frac{1}{2}$ minutes have elapsed. For most of this initial period while the pressures are being reduced, the pressure acting on the edges of the sandwich remains higher than that acting on the upper main face of the assembly. These pressures are maintained until 6 minutes have elapsed, when the temperature of the sandwich is between 35° and 40° C. The environmental pressure within the chamber is then allowed to rise to atmospheric pressure which is shown as being reached at the end of the seventh minute. Meanwhile, the pressure acting on the edges of the sandwich is allowed to rise from a few mm Hg to approximately 50 mm Hg fairly rapidly, and is further allowed to rise, but more slowly, from 50 mm Hg to about 200 mm Hg at the end of 15 minutes.

The conduit 16 (FIG. 1) is then disconnected from the sealing tube 17 so that the whole sandwich is subjected to atmospheric pressure, the automatic mechanism 7 opens the partition 5, and the carriage 21 carrying the sandwich is moved by the roller conveyor 9 into the compartment 3 which is maintained by the heating elements 12 and 13 at a temperature higher than compartment 2. In the compartment 3, the sandwich continues to be heated until the temperature reaches 135° C. In the meantime, pressure in the compartment 3 has been increased to 13 kg/cm$^2$.

When these firm bonding conditions have been obtained, the automatic mechanism 8 opens the partition 6 so as to permit the carriage 21 to be displaced by the conveyor 9 into the compartment 4 in which the pressure is progressively lowered and in which the sandwich becomes progressively cooled before being conveyed to the unloading station.

Figure 3:
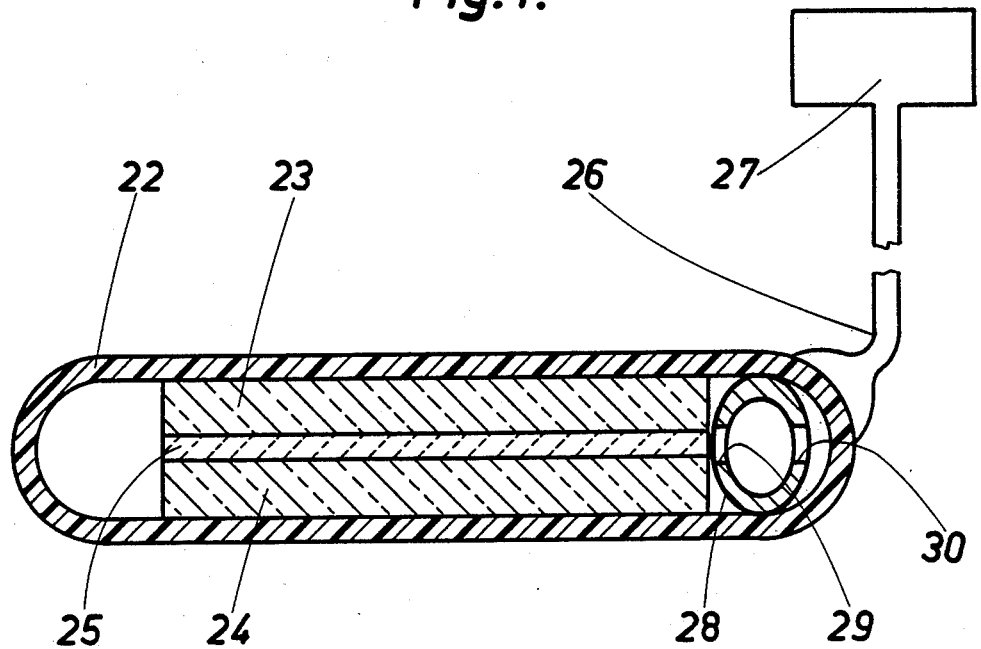
FIG. 3 is a cross-sectional elevation of an assembly located in an alternative form of edge-aspirating device.

FIG. 3 shows an alternative means for aspirating excess fluid substances from the inter-sheet space of the sandwich at its edge. This means comprises an envelope 22 which encloses the entire sandwich comprising the glass sheets 23 and 24 and the intervening intumescent layer 25. The envelope is connected by a vacuum line 26 to a pump 27 by which sub-atmospheric pressure can be maintained within the envelope to keep the inter-sheet space subjected to suction. When the pump is operated, the top and bottom walls of the envelope are drawn against the main external faces of the enclosed sandwich. However the envelope, at least at its peripheral zone, is sufficiently rigid to resist collapse against the edges of the sandwich so that a space at a sub-atmospheric pressure maintained by the pump 27 is preserved within the envelope, around the edges of the sandwich.

The use of an envelope which encloses the sandwich affords the advantage that the size of the envelope in relation to the dimension of the sandwich is not critical. The envelope can be easily applied to sandwiches of a range of different sizes. In addition, the envelope does not hinder uniform heating of the whole sandwich if this should be desired. Furthermore, the use of such an envelope facilitates the application of uniform pressure over the whole area of the main faces of the sandwich during its treatment, so that reaction forces arising from pressure differences between the environment in which the envelope is placed and the space within the envelope will not be such as to cause flexure of the outer sheets 23 and 24 of the sandwich. As explained before, such flexure can lead to the formation of bubbles in the margins of the layer 25 and can also lead to a non-flat final product.

In a variant of the embodiment just described, an optional bracing member 28 may be provided in the space within the envelope 22. Such bracing member 28 may be in the form of a tube as shown provided with holes such as 29 and 30 so that the edges of the intumescent layer 25 can be aspirated. Such a bracing member 28 can relieve the margins of the sheets 23 and 24 from substantially all reaction forces due to pressure differences across the walls of the envelope 22. Such a bracing member may also be used in conjunction with some other form of envelope for the edge of a sandwich such as the sealing tube illustrated in FIG. 1.

In a variant of the process described with reference to FIG. 1, the sandwich assembly is left in the first chamber 2 at atmospheric pressure until its temperature reaches 90° C. A satisfactory bond can be formed in this way.

In variants of the temperature and pressure schedule illustrated in FIG. 2, the sub-atmospheric pressure in the space around the edges of the sandwich is reduced to about 10 mm Hg and to about 20 mm Hg. In such variants the environmental pressure within the chamber is reduced to about 200 mm Hg and about 300 mm Hg respectively. By operating in this way, the temperature of the sandwich can be increased more rapidly without risk of intumescence. In a further variant, the sub-atmospheric pressure acting on the face and edges of the sandwich is released substantially simultaneously.

Figure 4:
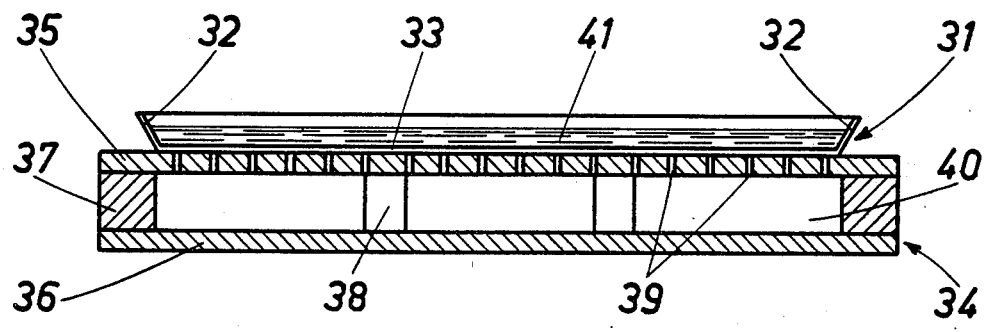
FIG. 4 is a cross-sectional view of a mold which can be used for forming a stratum of intumescent material.
Figure 5:
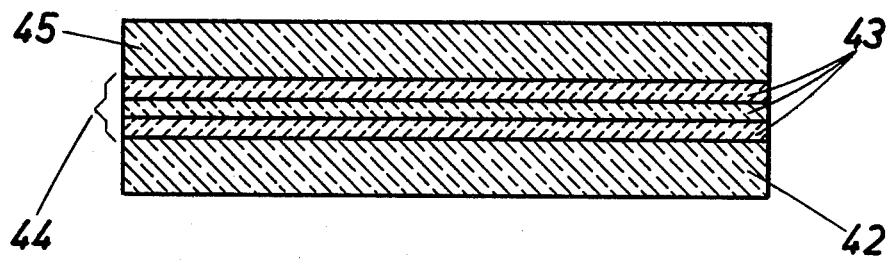
FIGS. 5 and 6 are cross-sectional views of sandwich assemblies prior to bonding.
Figure 6:
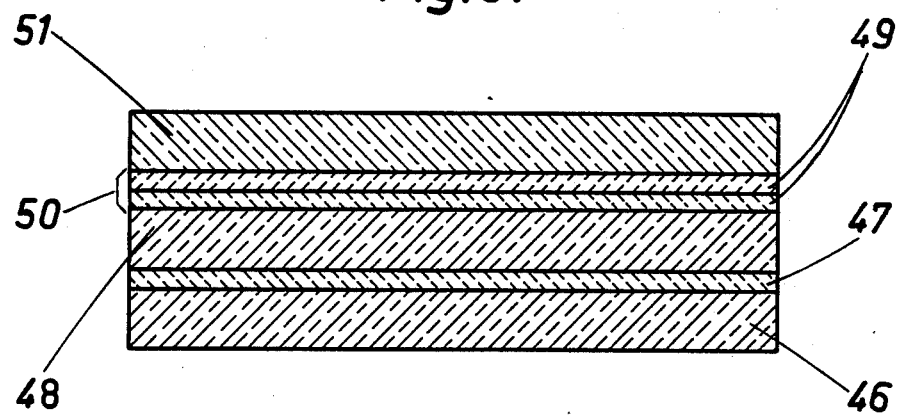

FIGS. 4 to 6 illustrate how a sandwich may be made. In FIG. 4, a mold 31 having sidewalls 32 and a base 33 made of polyvinyl chloride, polyethylene or some other suitable material is held on an air-box 34 comprising a support plate 35 which is held spaced from a base plate 36 by a wall 37 and intermediate spacers 38. The support plate 35 is perforated with holes 39 so that when the interior 40 of the air-box 34 is connected to a vacuum pump (not shown) pressure there will be reduced and the mold base 33 will be held securely against the support plate 35.

Fluid intumescent material is poured into the mold 31 where it is caused or allowed to set, e.g. in known manner in drying chamber under controlled temperature and humidity conditions, to form a stratum 41. In a modification of this process, the base 32 of the mold 31 is made of water vapor permeable material, e.g. Cellophane (Trademark). In this case drying of the intumescent material also takes place by diffusion of water vapor through the semi-permeable base 32 into the air-box 34.

A vitreous sheet, which may optionally carry a previously formed stratum, is then applied to the stratum 41 in the mold, the mold is inverted and the vacuum in the air-box 34 released, and the mold can then be peeled away from the stratum on the vitreous sheet.

FIG. 5 shows an assembly of a first vitreous structural ply 42, several intumescent strata 43 which are to be bonded together to define a layer 44, and a second vitreous structural ply 45. In fact, three intumescent strata 43 are shown, but it will be appreciated that any number may be formed to build up the desired layer thickness. These strata may be formed as described with reference to FIG. 4, each of the outer strata may be formed directly onto its adjacent vitreous ply.

FIG. 6 shows an alternative form of sandwich construction consisting of a first vitreous sheet 46, a first single-stratum, intumescent layer 47 and a second vitreous sheet 48 on which are deposited two intumescent strata 49 forming a second layer 50 which is in turn covered by a third vitreous sheet 51. It will be appreciated that each intumescent stratum may be formed on one of the vitreous sheets prior to assembly or that such strata may be formed separately, e.g. as described with reference to FIG. 4 and then transferred to the vitreous sheets. It will also be appreciated that although it is convenient in practice, it is not necessary that the two layers 47 and 50 should be formed of the same intumescent material.

EXAMPLE 1 (FIG. 5)

A sandwich can be made having the following properties:

sheets 42 and 45 each of glass 5 mm thick; and layer 44 having three strata 43 of hydrated sodium silicate each 1.1 mm thick.

Each stratum 43 can be made in apparatus such as is illustrated in FIG. 4 from an aqueous solution having the following properties:

weight ratio $SiO_2:Na_2O$, 3.3 to 3.4.
density 37° to 40° Baumé.

The strata thus formed can then be dried in air at 35° C. and 50% relative humidity until they contain 34% by weight residual water.

In a variant of this Example, the layer 44 is formed from a single stratum of hydrated sodium silicate 2.5 mm thick.

EXAMPLE 2 (FIG. 6)

A sandwich can be made having the following properties:

sheets 46, 48 and 51 each of glass 3 mm thick;
single stratum layer 47 of hydrated sodium silicate 1.5 mm thick; and
twin stratum layer 50, of hydrated sodium silicate, each stratum 49 being 1.5 mm thick.

EXAMPLE 3

In a variant of Example 1 there are five strata of hydrated sodium silicate each 1.2 mm thick, and the two glass sheets are chemically tempered.

EXAMPLE 4

In a variant of Example 2 the two outer glass sheets 46 and 51 are 5 mm thick and the middle sheet 48 is 3 mm thick, and each of the three strata used to form the two intumescent layers 47 and 50 is of hydrated potassium silicate 1.4 mm thick.

EXAMPLE 5

As a variant of the preceding Examples in which hydrated sodium silicate is used as intumescent material, each glass sheet face which in the finished panel will border the intumescent material is given a protective coating of zirconium oxide which is 400 Å thick and deposited by pyrolysis. In a variant of this example, the zirconium oxide coating is replaced by one of anhydrous aluminum phosphate.

EXAMPLE 6

In a variant of Example 1, each of five strata 43 is formed of hydrated aluminum phosphate 0.3 mm thick, and the glass sheets 42 and 45 are each 4 mm thick. Prior to formation of the sandwich, a 500 Å thick protective coating of anhydrous aluminum phosphate was applied to each glass sheet face destined to contact the intumescent layer. In a variant of this Example, the protective coating was of zirconium oxide.

EXAMPLE 7

In a variant of Example 1, each of two strata 43 is formed of hydrated sodium aluminate 0.8 mm thick.

In a variant of this Example, the intumescent strata are each formed of one of the following metal salts in hydrated form: potassium aluminate, sodium plumbate, potassium plumbate, sodium stannate, potassium stannate, aluminum sodium sulphate, aluminum potassium sulphate, sodium borate, sodium orthophosphate and potassium orthophosphate.

A sandwich such as that described in any of Examples 1 to 5 may then be subjected to a treatment according to the invention in the manner described with reference to FIG. 1 or 3 in order that it should become bonded together. Sandwiches containing other intumescent materials can be treated in a similar manner.

What is claimed is:

1. A method of manufacturing a laminated, light-transmitting fire-screening panel comprising at least one solid layer of intumescent material sandwiched between two structural plies without the use of a sheet of plastic material to effect the bonding, comprising the steps of forming a stratum from an intumescent sodium silicate material, assembling said stratum and a first structural ply to an inorganic face of a pane comprising a second structural ply so that said stratum is in contact with said inorganic face and sandwiched between said structural plies, enveloping at least the edges of the sandwich assembly in such manner as to define a space around the edges in which sub-atmospheric pressure can be created for subjecting the inter-ply space to suction at the edges, and subjecting the sandwich assembly to a treatment in which at least one of the main external faces of the sandwich assembly is exposed to sub-atmospheric environmental pressure while the sandwich assembly is exposed to heat in a treatment chamber and the inter-ply space is subjected to the aforesaid suction to effect bonding of the various plies without causing the intumescent material to become tumid, the environmental temperature during said treatment being at least 50° C. and not more than 95° C., the sandwich assembly being subjected to a supplementary bonding stage following said treatment in which final bonding takes place at above atmospheric pressure in excess of 10 kg/cm$^2$.

2. A method as defined in claim 1 wherein in said treatment the subjection of the sandwich assembly to sub-atmospheric environmental pressure and to heat in the treatment chamber, and the subjection of the inter-ply space to suction commence simultaneously.

3. A method as defined in claim 1 wherein said sub-atmospheric pressure in said space around the edges of the sandwich assembly is different from the sub-atmospheric environmental pressure acting upon at least one of the main external faces of the sandwich assembly for at least a portion of the treatment period.

4. A method as defined in claim 3 wherein the sub-atmospheric pressure in said space around the edges is reduced during said treatment, such sub-atmospheric pressure being initially higher but becoming lower than the sub-atmospheric pressure acting on at least one of the main external faces.

5. A method as defined in claim 1 wherein said pressure in said space around the edges is reduced from atmospheric pressure to 20 mm of mercury or less.

6. A method as defined in claim 1 wherein said pressure in said space around the edges is reduced from atmospheric pressure to 10 mm of mercury or less.

7. A method as defined in claim 1 wherein the environmental pressure acting upon at least one of the main external faces during the treatment is reduced from atmospheric pressure to 500 mm of mercury or less.

8. A method as defined in claim 1 wherein the environmental pressure acting upon at least one of the main external faces during the treatment is reduced from atmospheric pressure to 200 mm of mercury or less.

9. A method as defined in claim 1 wherein the temperature of the sandwich assembly is progressively increased during said treatment.

10. A method as defined in claim 9 wherein during said treatment the sub-atmospheric pressure acting upon at least one of the main external faces is reduced to a value of 200 mm of mercury or less before being increased to a value above 400 mm of mercury while the sandwich assembly is progressively heated and while sub-atmospheric pressure is maintained in said space around the edges.

11. A method as defined in claim 1 wherein said sub-atmospheric pressure around the edges of the sandwich is maintained after the environmental pressure on at least one of the main external faces of the sandwich assembly has been increased to atmospheric pressure or higher.

12. A method as defined in claim 11 wherein the pressure around the edges of the sandwich assembly is increased to atmospheric when the desired temperature for the sandwich assembly has been reached and after the environmental pressure acting on at least one of the main external faces of the sandwich assembly has been increased to atmospheric pressure or higher.

13. A method as defined in claim 1 wherein in said supplementary bonding stage the sandwich assembly is subjected to heat.

14. A method as defined in claim 13 wherein the sandwich assembly is heated under pressure in an autoclave in a final stage.

15. A method as defined in claim 1 wherein during said supplementary bonding stage the temperature of the sandwich assembly is progressively further increased.

16. A method as defined in claim 1 wherein said suction from the inter-ply space is achieved by maintaining sub-atmospheric pressure conditions in an envelope which encloses the sandwich assembly while preserving a space between the inner surface of the envelope and the sandwich edges.

17. A method as defined in claim 16 wherein pressure reaction forces which would otherwise be applied to the margins of the sandwich assembly are supported by one or more bracing members located within the space around the edges of the sandwich assembly.

18. A method as defined in claim 1 wherein each structural ply is of vitreous material.

19. A fire screening panel manufactured by a method according to claim 1.

* * * * *